United States Patent
Kojima et al.

(10) Patent No.: US 6,811,083 B2
(45) Date of Patent: Nov. 2, 2004

(54) IC CARD, AND METHOD AND PROGRAM FOR PREVENTING ILLEGAL USE OF IC CARD

(75) Inventors: Kenji Kojima, Kawasaki (JP); Kentaro Umesawa, Yokohama (JP); Hideyuki Miyake, Yokohama (JP); Tatsuyuki Matsushita, Yokohama (JP); Yuuki Tomoeda, Yokohama (JP); Hideo Shimizu, Kawasaki (JP); Hiroshi Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/720,158

(22) Filed: Nov. 25, 2003

(65) Prior Publication Data

US 2004/0124250 A1 Jul. 1, 2004

(30) Foreign Application Priority Data

Dec. 25, 2002 (JP) ........................ 2002-373565

(51) Int. Cl.$^7$ .............................................. G06K 7/08
(52) U.S. Cl. ...................................................... 235/451
(58) Field of Search ................................ 235/451, 375, 235/377, 380, 382–383, 476, 492

(56) References Cited

U.S. PATENT DOCUMENTS

| 4,275,405 A | 6/1981 | Shannon | |
| 5,129,091 A | * 7/1992 | Yorimoto et al. | ........... 713/323 |
| 5,247,164 A | * 9/1993 | Takahashi | ........... 235/492 |
| 5,406,064 A | * 4/1995 | Takahashi | ........... 235/492 |
| 5,760,644 A | 6/1998 | Lancaster et al. | |

FOREIGN PATENT DOCUMENTS

| JP | 63091793 A | * 4/1988 | .......... G06K/19/00 |
| JP | 10-189780 | 7/1998 | |
| JP | 2000-76402 | 3/2000 | |

* cited by examiner

Primary Examiner—Thien M. Le
Assistant Examiner—Edwyn Labaze
(74) Attorney, Agent, or Firm—Oblon, Spivak, McClelland, Maier & Neustadt, P.C.

(57) ABSTRACT

IC card receiving power from terminal and performing process, IC card comprises storage storing first identification information uniquely assigned to IC card, acquisition unit acquiring second identification information from terminal, first timer including first change unit whose state changes with lapse of time without power, state of first change unit changing from first initial state to final state via intermediate state, first timer outputting first signal indicative of changed state of first change unit when IC card receives power, comparison unit comparing second identification information with first identification information, determining whether second identification information and first identification information are identical, and providing first initializing signal according to at least one of determined results, and controller initializing first change unit to first initial state when receiving first initializing signal, controller further controlling IC card to make it inhibit process until state of first change unit changes to intermediate state.

24 Claims, 9 Drawing Sheets

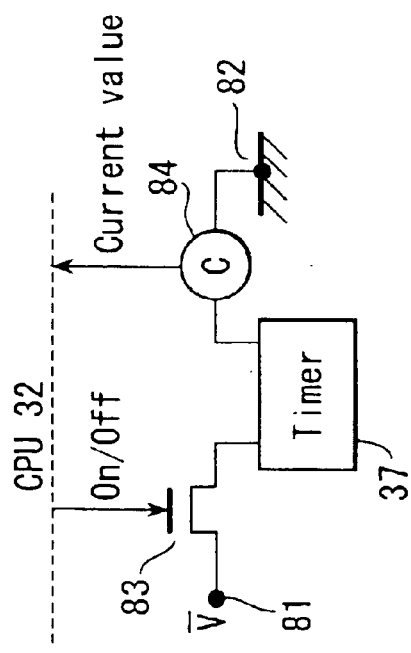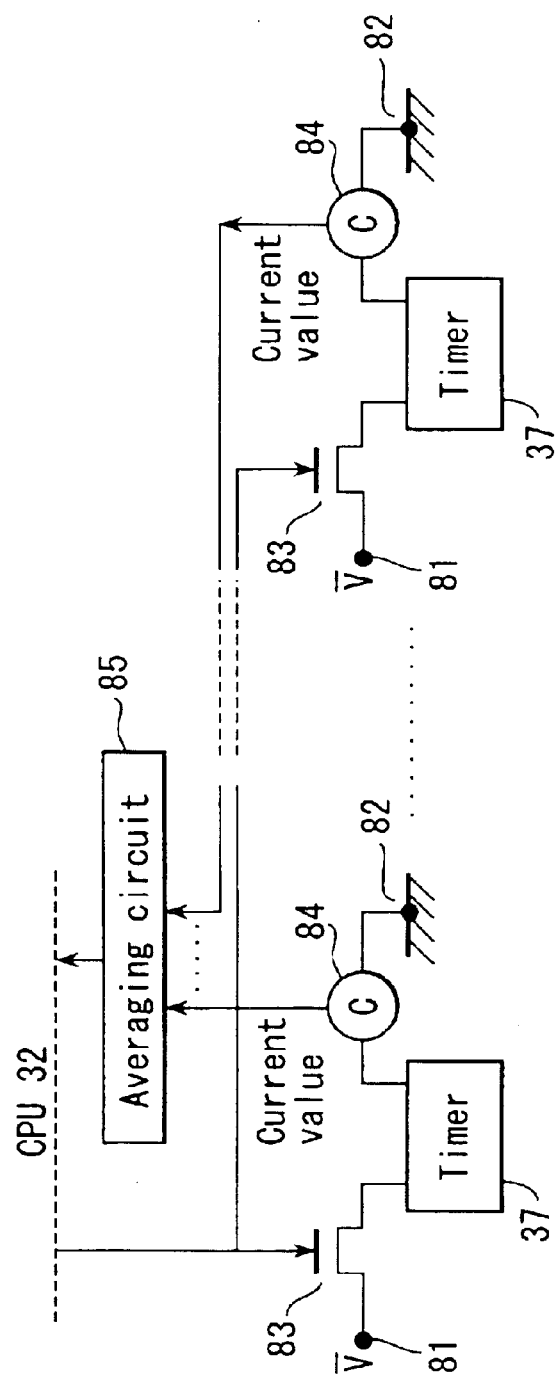
FIG. 9A
FIG. 9B

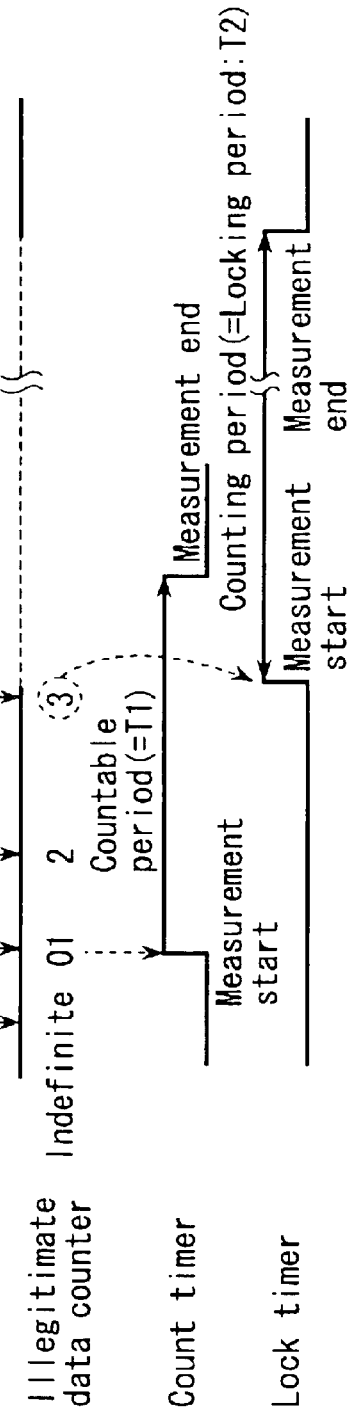
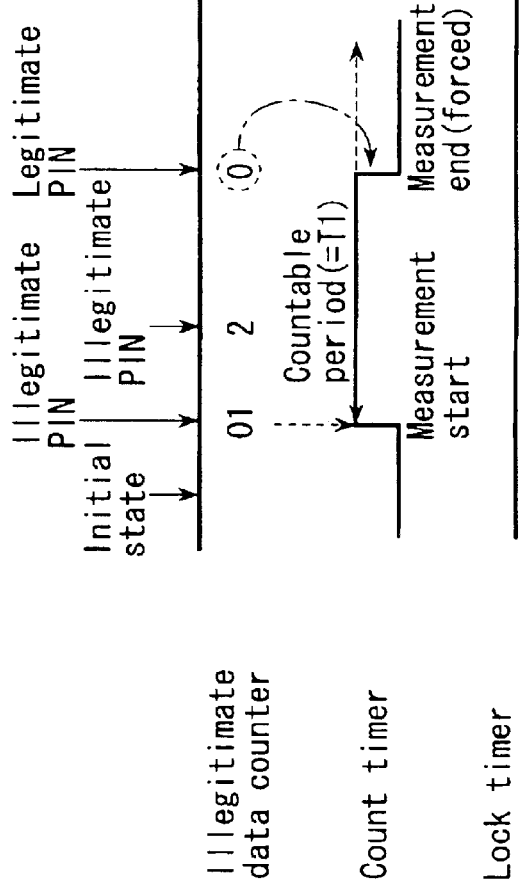
FIG. 12A
FIG. 12B

IC CARD, AND METHOD AND PROGRAM FOR PREVENTING ILLEGAL USE OF IC CARD

CROSS-REFERENCE TO RELATED APPLICATIONS

This application is based upon and claims the benefit of priority from the prior Japanese Patent Application No. 2002-373565, filed Dec. 25, 2002, the entire contents of which are incorporated herein by reference.

BACKGROUND OF THE INVENTION

1. Field of the Invention

The present invention relates to a contact-type IC card without built-in batteries, and more particularly to an IC card to counter erroneous input by a legitimate user and illegal use by a third party, and also relates to a method and program for preventing illegal use of an IC card.

2. Description of the Related Art

In general, an IC card is used to record important data such as personal information. Therefore, it is necessary to prevent illegal use of the card by a third party if it is lost. To this end, before a general IC card can be used, identification is performed using a personal identification number (PIN) (hereinafter referred to as "PIN identification"), to identify the legitimate owner (hereinafter referred to simply as the "owner") of the card. PIN information is generally stored in the IC card, and the owner of the card inputs their PIN through a terminal into which the IC card has been inserted. After the inserted PIN has been compared with the PIN stored in the IC card, the comparison result is sent to the terminal (see, for example, Jpn. Pat. Appln. KOKAI Publication No. 2000-76402).

In the PIN scheme, a card cracker who has acquired another person's IC card may guess and input the PIN of the owner of the card in order to impersonate the legitimate owner of the card. To thwart such PIN guessing, the process of locking an IC card when an incorrect PIN is input a predetermined number of times is now employed (this is called "PIN locking"). In a PIN-locked IC card, no further PIN input is possible, so the card cannot be used any more. PIN locking can be done on the system side (including the above-mentioned terminal, a server connected to the terminal, etc.) or on the IC card side.

PIN locking is performed to thwart card crackers. However, the owner of an IC card may well input their PIN incorrectly, resulting in PIN locking. If this happens, it is necessary to access, for example, the system manager to release the locked state. However, this is troublesome and so reduces the convenience of the IC card.

If the PIN locking of an IC card is limited to a certain length of time, a legitimate user can reuse the card sooner or later without the trouble of accessing, for example, the system manager. However, an illegitimate user is still prevented from continuously attempting to guess the PIN. So, there is a demand for setting a locking period.

However, if PIN locking is performed on the system side, it is necessary to centrally manage locking management information used for managing PIN locking, utilizing a server that handles a great many system-side terminals, and to access the locking management information each time PIN identification is performed. This increases the load on the system.

In light of the above, there is a need for a scheme in which PIN locking is performed on the IC card side. However, IC cards alone cannot provide their own power and so cannot time a PIN locking period. And if IC cards with built-in batteries are made, they lose the advantage of being usable without batteries.

BRIEF SUMMARY OF THE INVENTION

The present invention has been developed in light of the above, and aims to provide an IC card capable of realizing PIN locking for a predetermined period without external power and without increasing the load on the system side including a terminal, server, etc., and also to provide a method and program for preventing illegal use of an IC card.

According to a first aspect of the invention, there is provided an IC card receiving a power from an external terminal and performing a process, the IC card comprising: a storage which stores first identification information uniquely assigned to the IC card; an acquisition unit configured to acquire second identification information from the external terminal; a first timer including a first change unit whose state changes with lapse of time without the power, the state of the first change unit changing from a first initial state to a final state via an intermediate state, the first timer outputting a first signal indicative of a changed state of the first change unit in response to an instruction issued when the IC card receives the power; a comparison unit configured to compare the second identification information with the first identification information, determine whether or not the second identification information and the first identification information are identical to each other, and provide a first initializing signal according to at least one of determined results; and a controller which initializes the first change unit to the first initial state when receiving the first initializing signal from the comparison unit, the controller further controlling the IC card to make it inhibit the process until the state of the first change unit changes to the intermediate state.

According to a second aspect of the invention, there is provided a method of preventing illegal use of an IC card, the IC card receiving a power from an external terminal and performing a process, the method comprising: preparing an IC card including a storage which stores first identification information uniquely assigned to the IC card, an acquisition unit configured to acquire second identification information from the external terminal, a first timer including a first change unit whose state changes with lapse of time without the power, the state of the first change unit changing from a first initial state to a final state via an intermediate state, the first timer outputting a first signal indicative of a changed state of the first change unit in response to an instruction issued when the IC card receives the power; comparing the second identification information with the first identification information, determining whether or not the second identification information and the first identification information are identical to each other, and providing a first initializing signal according to at least one of determined results; and initializing the first change unit to the first initial state when the first initializing signal is received, and inhibiting the process until the state of the first change unit changes to the intermediate state.

According to a third aspect of the invention, there is provided a program stored in a storage medium and executed by a processor included in an IC card, the program comprising: means for instructing a processor to compare second identification information with first identification information, determine whether or not the second identification information and the first identification information are identical to each other, and providing a first initializing signal according to at least one of determined results the IC card receiving a power from an external terminal and performing a process using the program, the IC card including: a storage which stores the first identification information uniquely assigned to the IC card; an acquisition unit configured to acquire the second identification information from the external terminal; and a first timer including a first change unit whose state changes with lapse of time without the power, the state of the first change unit changing from a first initial state to a final state via an intermediate state, the first timer outputting a first signal indicative of a changed state of the first change unit in response to an instruction issued when the IC card receives the power; and means for instructing the processor to initialize the first change unit to the first initial state when the first initializing signal is received, and instructing the processor to inhibit the process until the state of the first change unit changes to the intermediate state.

BRIEF DESCRIPTION OF THE SEVERAL VIEWS OF THE DRAWING

FIGS. 9A and 9B show examples of connection between the timer 36/37 and CPU 32;

FIGS. 12A and 12B are time charts according to the flowchart of FIG. 11 that illustrates the operation related to PIN identification;

DETAILED DESCRIPTION OF THE INVENTION

An embodiment of the invention will be described in detail with reference to the accompanying drawings.

Figure 1:
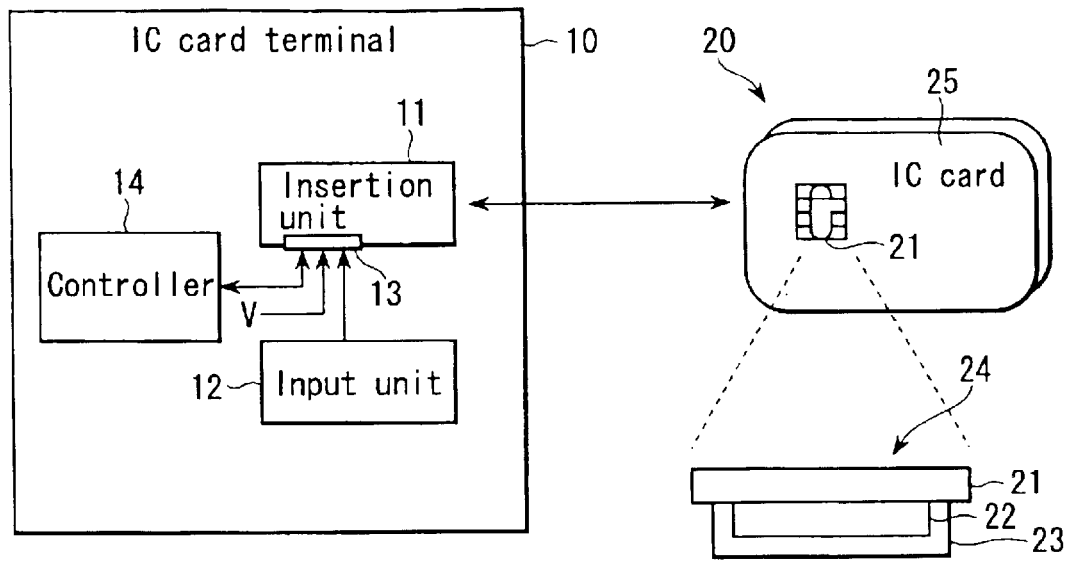
FIG. 1 illustrates the whole system according to an embodiment of the invention.

FIG. 1 illustrates the whole system according to an embodiment of the invention. As shown, the system comprises an IC card terminal and contact-type IC card 20. It is a matter of course that the IC card terminal 10 may be connected via a network to, for example, a server that centrally manages a large number of IC card terminals 10.

The contact-type IC card 20 comprises a plastic card member 25 of a rated size and an IC module 24. The IC module 24 includes an IC chip 22 sealed with a sealing member 23 and configured to perform a predetermined logical operation, and an IC card interface 21 exposed to the outside and connected to the IC chip 22. When the IC cared 20 is inserted in the IC card terminal 10, it receives power from the terminal, and the IC chip 22 performs the predetermined logical operation. On the other hand, when the IC cared 20 is not inserted in the IC card terminal 10, the IC chip 22 does not perform the logical operation.

The IC card terminal 10 comprises an insertion unit 11 for inserting therein the IC card 20, and an IC card interface 13 to be electrically connected to the IC card 20 when the IC card 20 is inserted in the insertion unit 11. When the IC card 20 is inserted, the IC card interface 13 opposes the IC card interface 21 of the IC card 20. The IC card terminal 10 further comprises an input unit 12 for permitting a user to input a PIN (Personal ID Number) after the IC card 20 is inserted, and a controller 14 for controlling the whole IC card terminal 10. The input unit 12, controller 14 and power supply V for supplying power to the IC card 20 are connected to the IC card interface 13.

In the system constructed as above, to use the IC card 20, firstly, the IC card 20 is inserted into the IC card terminal 10, then a user PIN is input through the input unit 12 and supplied to the IC chip 22 of the IC card 20 via the IC card interfaces 13 and 21. The IC chip 22, in turn, compares the supplied PIN with the legitimate PIN stored therein. If it is determined that these PINs are identical to each other, a command is supplied from the IC card terminal 10 to the IC card 20 via the IC card interfaces 13 and 21. The IC card 20, for example, interprets the command, operates in accordance with the command, and responds to the IC card terminal 10.

Figure 2:
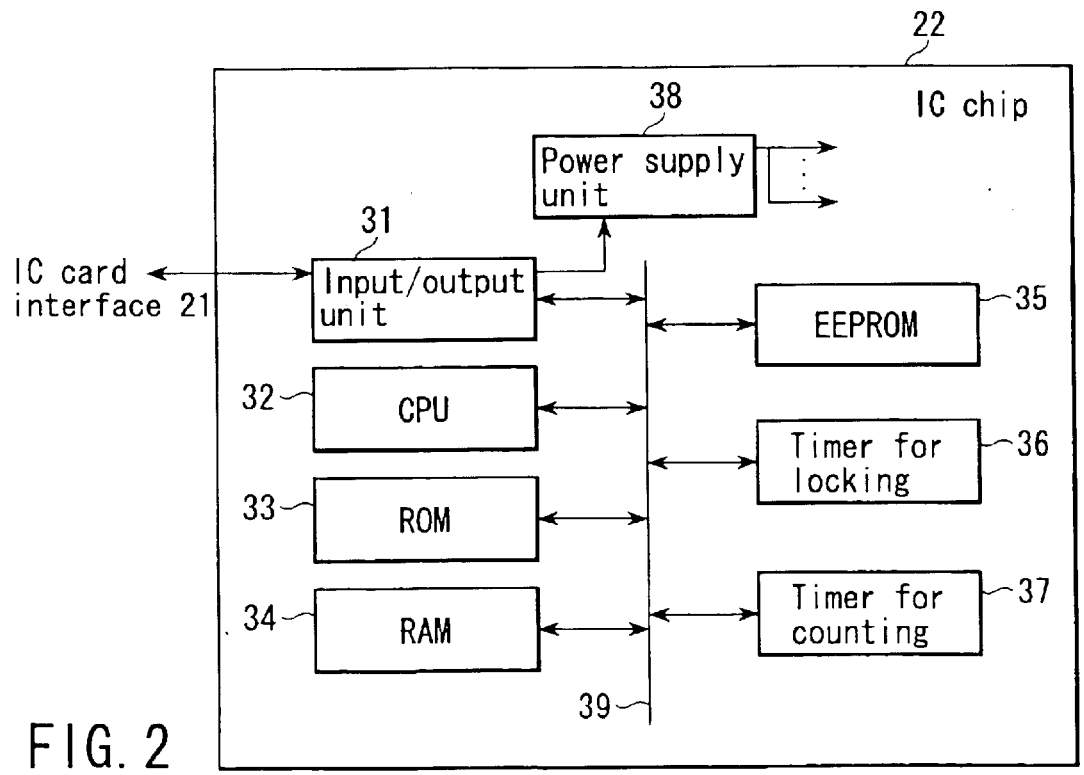
FIG. 2 is a block diagram illustrating the internal configuration of an IC chip 22 incorporated in an IC card 20.

FIG. 2 is a block diagram illustrating the internal configuration of the IC chip 22 incorporated in the IC card 20.

As seen from FIG. 2, an input/output unit 31 is connected to the IC card interface 21 and internal bus 39. When the IC card 20 is inserted in the IC card terminal 10, the input/output unit 31 supplies a power supply unit 38 with the power acquired from the terminal 10 via the IC card interface 21, transmits, to the internal bus 39, the command or data received from the IC card interface 21, and transmits, to the IC card interface 21, the command or data received from the internal bus 39.

A CPU 32 controls the whole IC chip 22, and operates in accordance with the program stored in a ROM 33. The ROM 33 stores, as well as the program, the PIN assigned to the IC card 20. The PIN stored in the ROM 23 will hereinafter be referred to as a "legitimate PIN", and any other PIN will be referred to as an "illegitimate PIN". In the case of an IC card 20 that permits the PIN to be changed, the PIN may be stored in an EEPROM 35 described later. The ROM 33 also stores a threshold value for limiting the number of occasions an illegitimate PIN is input during a predetermined period of time.

A RAM 34 is a work memory used by the CPU 32. The EEPROM 35 is a nonvolatile semiconductor memory that can be rewritten by the CPU 32, and has a count value storing area for storing the number of occasions an illegitimate PIN is input during a predetermined period of time.

The power supply unit 38 is connected to the input/output unit 31 so that it receives the power supplied from the IC card terminal 10 and supplies it to each element of the IC chip 22.

A timer 36 for locking and timer 37 for counting have the same structure, and are disposed to change in state with lapse of time without external power, thereby measuring whether or not a predetermined time period has elapsed. Each state of the timer 36 and timer 37 changes from an initial state to a final state via an intermediate state. The timers 36 and 37 measure different predetermined time periods. The timer 36 can measure a longer time period than the timer 37. The lock timer 36 sets a locking period in which the IC card 20 cannot perform any process other than the time measurement. On the other hand, the count timer 37 sets a period in which the number of occasions an illegitimate PIN is input is counted.

The timers 36 and 37 (hereinafter generically referred to as a "timer 36/37") will be described in more detail.

Figure 3:
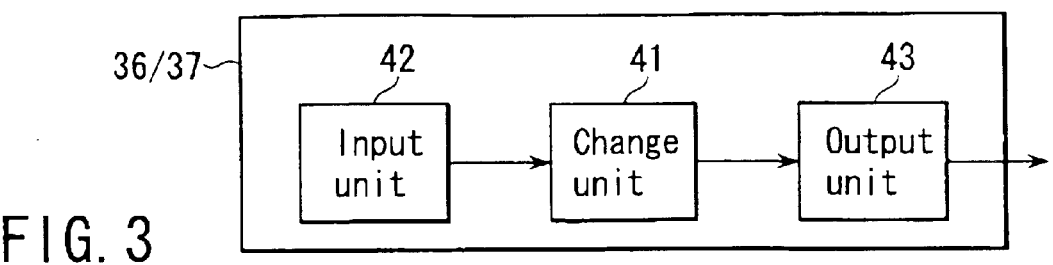
FIG. 3 is a block diagram illustrating the basic concept of a timer 36/37.

FIG. 3 is a block diagram illustrating the basic concept of the timer 36/37. The timer 36/37 comprises: a change unit 41, the state of which changes with lapse of time without a power supply, such as battery; an input unit 42 for inputting an input signal to the change unit 41; and an output unit 43 for outputting an output signal changed relative to the input signal based on the state of the change unit 41. The change in the state of the change unit 41 is utilized to measure time. The input unit 42 and output unit 43 are used to confirm the state of the change unit 41.

Figure 4:
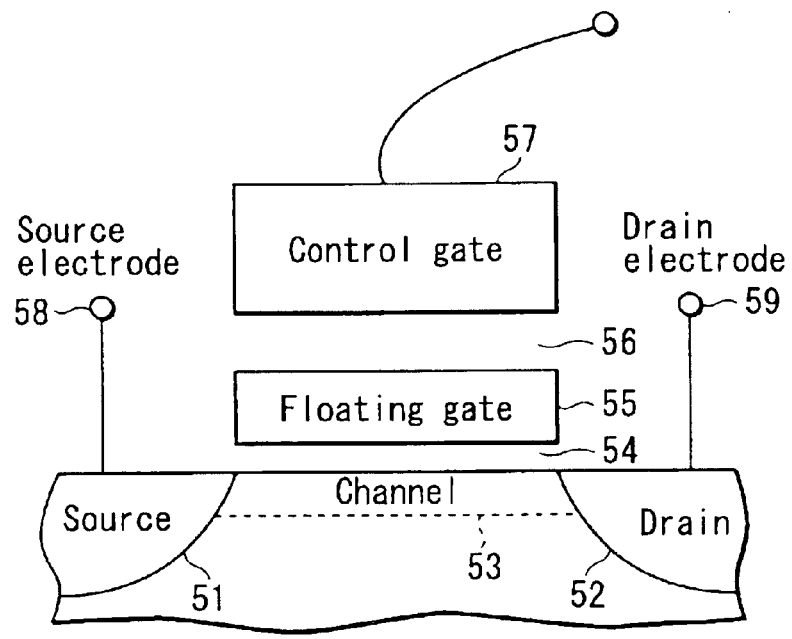
FIG. 4 illustrates a first example for realizing the timer 36/37.

FIG. 4 illustrates a first example that realizes the basic concept of the timer 36/37 of FIG. 3.

The first example of the timer 36/37 comprises: a first layer having a source region 51, drain region 52 and channel region 53 therebetween; a second layer provided on the first layer and formed of a tunnel insulation film 54; a third layer provided on the second layer and formed of a floating gate 55; a fourth layer provided on the third layer and formed of an insulation film 56; and a fifth layer provided on the fourth layer and formed of a control gate 57. A source electrode 58 and drain electrode 59 are provided on the source and drain regions 51 and 52, respectively.

Figure 5:
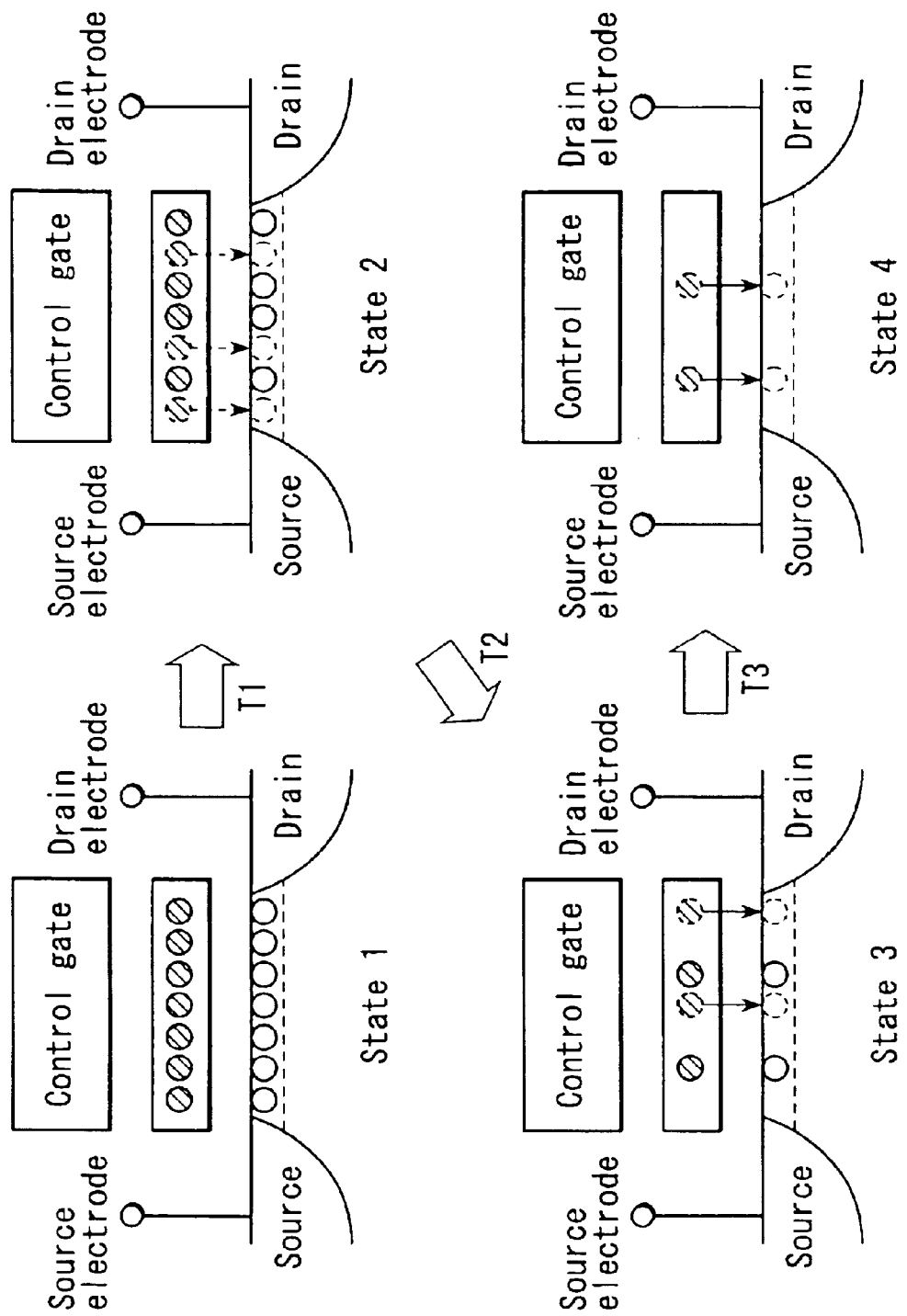
FIG. 5 illustrates changes in the state of the timer 36/37 with lapse of time.

FIG. 5 illustrates changes with lapse of time in the state of the timer 36/37 of FIG. 4. In the figure, hatched circles indicate electrons, and white circles indicate positive holes.

In FIG. 5, state 1 is the initial state. In the timer 36/37 that assumes the state 1, a pre-process is performed, in which the control gate 57 applies a high electric field between the substrate boundary of the channel region 53 and the floating gate 55, thereby injecting electrons from the channel into the floating gate 55 utilizing FN tunneling. At this time, positive holes gather at the substrate boundary of the channel region 53, whereby a channel is formed on the substrate boundary between the source and drain regions 51 and 52.

In the state 1, the electrons in the floating gate 55 gradually shift, by direct tunneling, to the substrate boundary, thereby reducing the level of the electric field at the substrate boundary in the channel region 53. State 2 of FIG. 5 is assumed at a time point $T_1$ a certain time period after the state 1. State 3 of FIG. 5 is assumed at a time point $T_2$ a certain time period after the state 2. Similarly, state 4 is the state assumed at a time point $T_3$ a certain time period after the state 3. The circles indicated by the broken lines represent the shift of electrons made due to direct tunneling by the respective time points. In the state 4 (i.e. a final state) at the time point $T_3$, most electrons escape from the floating gate 55, therefore the channel at the substrate boundary of the channel region 53 disappears. As a result, no signals are output.

Figure 6:
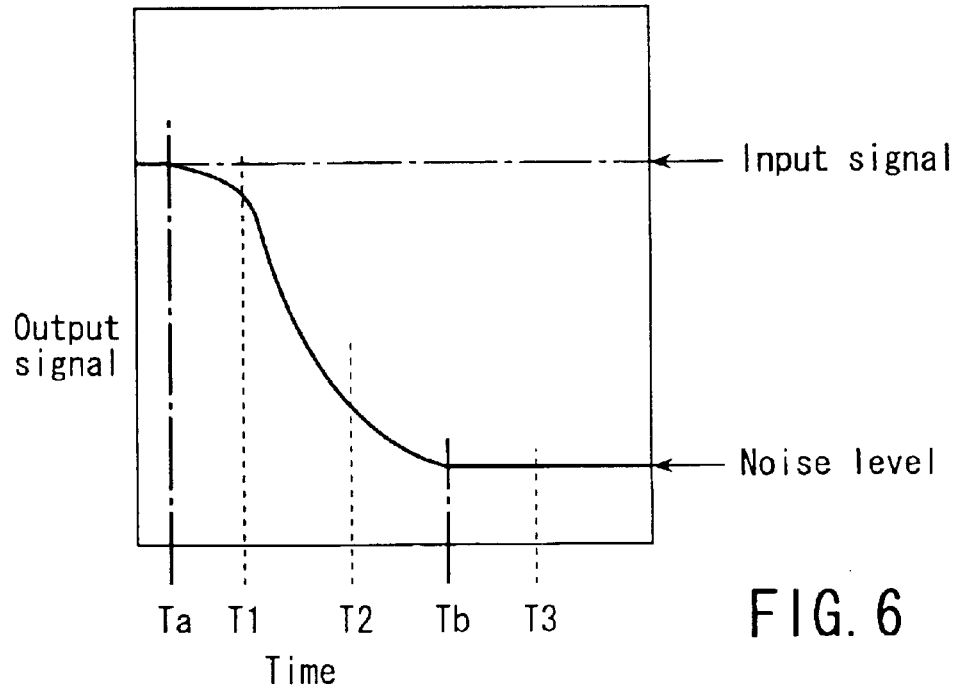
FIG. 6 is a graph showing the relationship between the time and the output signal of the timer 36/37.

FIG. 6 is a graph illustrating the relationship between the time and the output signal of the timer 36/37. Direct tunneling occurs between time points $T_a$ (=0) and $T_b$ (i.e. between the states an initial state and an intermediate state), and lastly, the channel disappears, whereby the level of the output signal is reduced to the noise level. Since the timer 36/37 supplies an output signal corresponding to a change in level between $T_a$ (=0) and $T_b$ (=e.g. the time when the output signal level reaches the noise level), the side for receiving the output signal can determine whether or not a predetermined time period has elapsed, or can determine a specific time point (e.g. $T_1$, $T_2$ or $T_3$ shown in FIG. 6) a predetermined time period after the initial state if the relationship between the state of the timer 36/37 and the level of the output signal is always clear. The time points $T_1$, $T_2$ and $T_3$ correspond to the states 2, 3 and 4 in FIG. 5.

Figure 7:
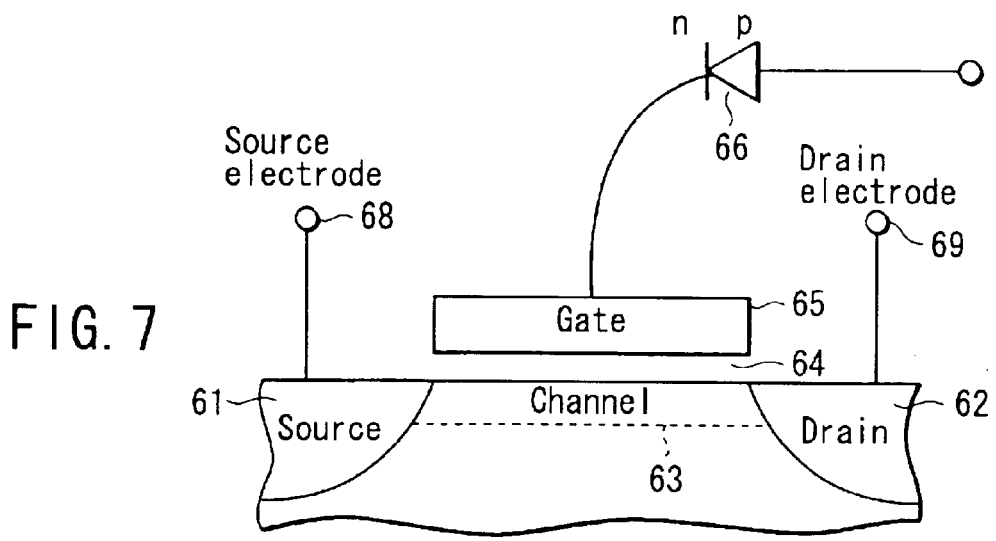
FIG. 7 illustrates a second example for realizing the timer 36/37.

FIG. 7 is a second example that realizes the basic concept of the timer 36/37 of FIG. 3. The second example of the timer 36/37 comprises: a first layer having a source region 61, drain region 62 and channel region 63 therebetween; a second layer provided on the first layer and formed of a tunnel insulation film 64; a third layer provided on the second layer and formed of a gate 65; and a PN junction 66 provided on the third layer for controlling a leak current. A source electrode 68 and drain electrode 69 are provided on the source and drain regions 61 and 62, respectively.

The change in the state of the second example of the timer 36/37 with lapse of time is similar to that of the first example of the timer 36/37, although in the former, current leakage occurs in a PN junction, and in the latter, direct tunneling occurs. Therefore, no description is given of the change in the state of the second example of the timer 36/37 with lapse of time.

Figure 8:
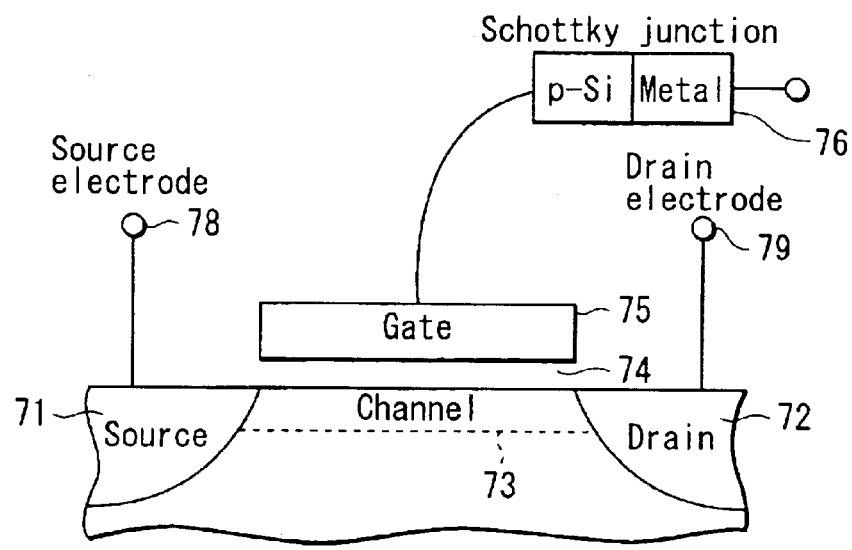
FIG. 8 illustrates a third example for realizing the timer 36/37.

FIG. 8 is a third example that realizes the basic concept of the timer 36/37 of FIG. 3. The third example of the timer 36/37 comprises: a first layer having a source region 71, drain region 72 and channel region 73 therebetween; a second layer provided on the first layer and formed of a tunnel insulation film 74; a third layer provided on the second layer and formed of a gate 75; and a Schottky junction 76 provided on the third layer for controlling a leak current. A source electrode 78 and drain electrode 79 are provided on the source and drain regions 71 and 72, respectively.

The change in the state of the third example of the timer 36/37 with lapse of time is similar to that of the first example of the timer 36/37, although in the former, current leakage occurs in a Schottky junction, and in the latter, direct tunneling occurs. Therefore, no description is given of the change in the state of the third example of the timer 36/37 with lapse of time.

When the above-described timer 36/37 is used, it is constructed as shown in the examples of connection of FIGS. 9A and 9B.

In the example of FIG. 9A, a voltage can be applied between the opposite ends of the timer 36/37. A power supply terminal 81 is connected to the source electrode 58, 68, 78 of the timer 36/37 via a switch element 83, while a GND terminal 82 is connected to the drain electrode 59, 69, 79 via an ampere meter 84. The switch element 83 is connected to an ON/OFF (enable) signal line, and is turned on when an ON signal is supplied thereto from the ON/OFF signal line. The ampere meter 84 is connected to output a current value to the CPU 32.

To detect the state of the timer 36/37 during the operation of the IC chip 22, the CPU 32 turns on the switch element 83, thereby applying a predetermined voltage between the power supply terminal 81 and GND terminal 82. As a result, a current flows through the timer 36/37, which is measured by the ampere meter 84. The measured current value is output to the CPU 32. Thus, the CPU 32 detects the state of the timer 36/37.

As described above referring to FIG. 5, a pre-process must be performed in the timer 36/37 before time measurement. Therefore, the timer 36/37 is equipped with a means for performing the pre-process (not shown). Upon receiving an instruction to start time measurement from the outside, the timer 36/37 performs the pre-process and then starts time measurement.

In the example of connection shown in FIG. 9A, a single timer 36/37 is employed. However, a plurality of timers 36/37 may be employed. The states of the change units 41 of the timers 36/37 may change at the same rate or different rates, according to purpose. FIG. 9B illustrates timers 36/37 in which the states of the change units 41 change at different rates. As shown in FIG. 9B, the timers 36/37 identical to that shown in FIG. 9A are arrange in parallel, and the current values output therefrom are input to an averaging circuit 85. The average current value from the averaging circuit 85 is output to the CPU 32. The ON/OFF (enable) signal line led from the CPU 32 is connected to the switch elements 83 so that the CPU 32 can commonly control the switch elements 83. In this example, even if the change units 41 exhibit some different changes in state with lapse of time, the average current value output from the averaging circuit 85 enables a stable timer to be realized. Further, if change units 41 that exhibit different changes in state with lapse of time are intentionally employed (this example is not shown), various types of time information can be acquired.

Figure 10A:
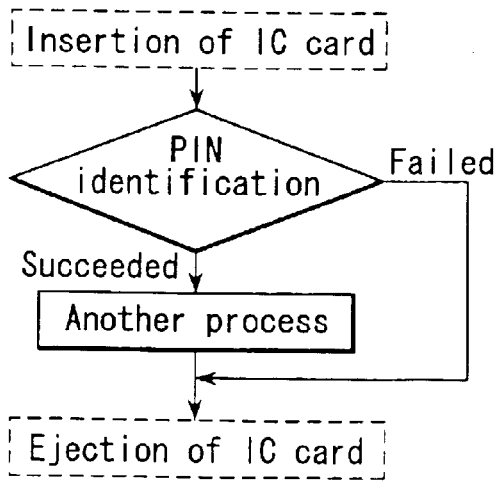
FIGS. 10A and 10B are schematic flowcharts illustrating the operation of the CPU 32 of the chip 22.
Figure 10B:
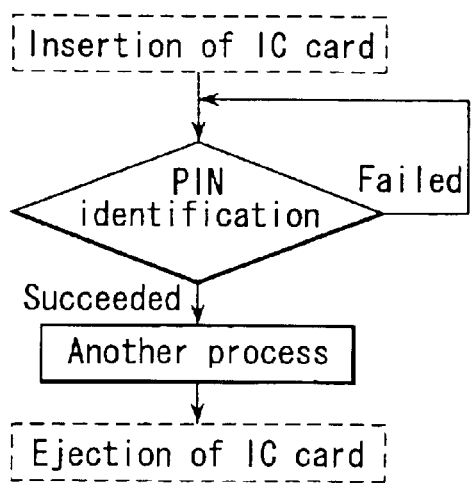

Referring to FIGS. 10A and 10B, the operation of the CPU 32 of the chip 22 will be schematically described.

After the IC card 20 is inserted into the IC card terminal 10 and before it is ejected therefrom, PIN identification is always performed, and a subsequent process can be performed if the PIN identification result indicates that the input PIN is legitimate. If the PIN identification result indicates that the input PIN is illegitimate, the card 20 is ejected (FIG. 10A), or PIN identification is performed again instead of ejecting the card 20 (FIG. 10B).

Referring to the flowchart of FIG. 11, the PIN identification process will be described in detail.

Firstly, a user inserts the IC card 20 into the IC card terminal 10, then inputs a PIN. The input PIN is supplied to the input/output unit 31 of the IC card 20 via the IC card interfaces 13 and 21. The PIN is then supplied therefrom to the CPU 32 (S101).

Upon receiving the PIN, the CPU 32 firstly determines whether or not the lock timer 36 is now measuring time (S102). Specifically, as described referring to FIGS. 9A and 9B, the CPU 32 reads a current value from the lock timer 36 and determines whether or not the current value reaches a noise level.

If it is determined that the timer 36 is now measuring time, PIN identification is determined to have failed since the IC card 20 is locked, which is reported to the terminal 10 (S103).

On the other hand, if it is determined that the timer 36 is not measuring time, it is then determined whether or not the count timer 37 is now measuring time (S104). This determination is performed in the same manner as at the step S102.

Unless the count timer 37 is measuring time, an illegitimate data counter stored in an illegitimate data count value storing area in the EEPROM 35 is reset (S105), thereby causing the count timer 37 to start time measurement (S106). If, for example, the count timer 37 is the above-described first example, a high voltage is instantly applied to the timer upon reception of the instruction to start measurement, whereby electrons are accumulated in the floating gate. After that, time measurement is started automatically.

Subsequently, the CPU 32 compares the PIN received at the step S101, with the legitimate PIN stored in the ROM 33 (S107).

If the received PIN is determined to be a legitimate one as a result of the comparison, the measurement by the count timer 37 is stopped (S108), thereby determining that the PIN identification process has succeeded, and informing the terminal 10 of this (S109). More specifically, at the step S108, the change in the state of the count timer 37 with lapse of time may be stopped. Alternatively, the timer 37 may be managed using a valid/invalid flag that is stored in, for example, the EEPROM 35 and indicates the validity/invalidity of the time measurement by the count timer 37.

If, on the other hand, the received PIN is determined to be illegitimate as a result of the PIN comparison, the value of the illegitimate data counter stored in the illegitimate data counter storing area of the EEPROM 35 is incremented (S110). After that, it is determined whether or not the incremented counter value reaches a threshold value stored in the ROM 33 (S111).

If the value of the illegitimate data counter reaches the threshold value, it is determined to be very possible that an illegitimate user is trying to illegally use the IC card 20, thereby causing the lock timer 36 to start measurement of time (S112). As a result, the IC card 20 is locked. The start of the time measurement may be performed in the same manner as that employed at the step S106. When the lock timer 36 starts time measurement, it is determined that PIN identification has failed, which is reported to the terminal 10 (S113).

Figure 11:
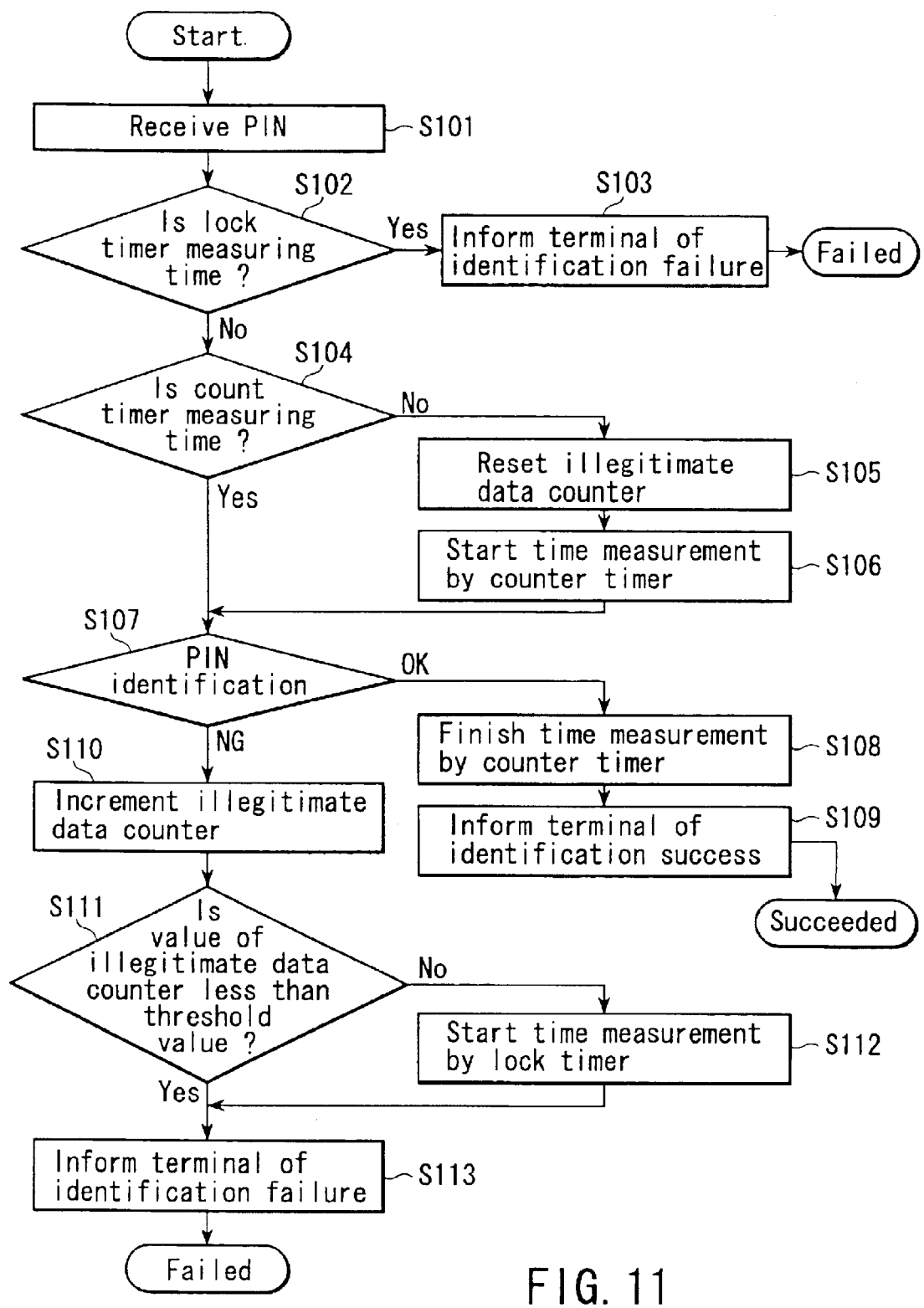
FIG. 11 is a flowchart useful in explaining the operations related to PIN identification.

FIGS. 12A and 12B are time charts according to the flowchart of FIG. 11 that illustrates the operation of the first example related to PIN identification. In the figures, it is assumed that the threshold value for input of an illegitimate PIN is 3, and the time periods of the time measurement by the count timer 37 and lock timer 36 are T1 and T2 (T1<T2), respectively. Further, "Illegitimate PIN" indicates that an illegitimate PIN has been input through the input unit 12, and "Legitimate PIN" indicates that a legitimate PIN has been input through the input unit 12.

In FIG. 12A, the initial value of the illegitimate data counter is indefinite (any value is OK), and the timers 36 and 37 do not yet start time measurement. In this state, if the first illegitimate PIN is input, the illegitimate data counter is reset to 0 at the step S105, whereby the count timer 37 starts time measurement, and the illegitimate data counter is incremented and set to "1" at the step S110. In this state, since the illegitimate data counter value is lower than the threshold value, the step S112 is not yet started.

Assume that before the time period T1 elapses from the input of the initial illegitimate PIN, the second illegitimate PIN is input. At this time, since the count timer 37 is measuring time, the steps S105 and S106 are not executed, and the illegitimate data counter is incremented to 2 at the step S110. Even in this state, the value of the illegitimate data counter is lower than the threshold value, therefore the step S112 is not yet started.

After that, assume that before the period T1 elapses from the input of the initial illegitimate PIN, the third illegitimate PIN is input. At this time, since the count timer 37 is measuring time, the steps S105 and S106 are not executed, and the illegitimate data counter is incremented to 3 at the step S110. At this time, the value of the illegitimate data counter reaches the threshold value, therefore the step S112 is executed. Specifically, the lock timer 36 starts time measurement, thereby locking the IC card 20 until the period T2 elapses. Within the period T2, even if a legitimate PIN is input, the locked state is maintained, and the identification process is finished at the step S103.

After the period T2 elapses, the lock timer 36 stops its time measurement. At this time, the count timer 37 has already finished its time measurement (since T1<T2). Thus, the timers 36 and 37 assume states similar to the initial states. Also at this time, the illegitimate data counter may have any value as in the initial state, since it is always reset at the step S105 when the next PIN is input.

FIG. 12B illustrates the case where a legitimate PIN is input when the count timer 37 is measuring time. In FIG. 12B, the initial state, initial illegitimate PIN and second illegitimate PIN are assumed to be identical to those of FIG. 12A. If the third PIN is a legitimate one, the steps S101, S102, S104 and S107 are executed in this order, and it is determined at the step S107 that the third PIN is a legitimate one, followed by the step S108 where the count timer 37 finishes time measurement and the PIN identification process is returned to the initial stage.

As described above, the IC card of the embodiment incorporates a lock timer that operates for a predetermined time period without external power, therefore can assume a PIN receivable state again a predetermined period after it is locked.

Further, since a timer that operates for a predetermined time period without external power is used as a timer for counting, if the card 20 is not locked within a predetermined period after the initial illegitimate PIN is input, the illegitimate data counter can be reset.

By virtue of this structure, even if a legitimate user has unintentionally input an illegitimate PIN a number of times higher than the threshold value, they can reuse the IC card after a predetermined period, without, for example, accessing the system managing side. Furthermore, since a PIN cannot be input for a predetermined period of time, a lot of time is required until an illegitimate user reaches the legitimate PIN by guessing and inputting a PIN a large number of times.

It is also advantageous that IC cards according to the invention enable their users to utilize conventional IC card terminals without modifying them.

Figure 13:
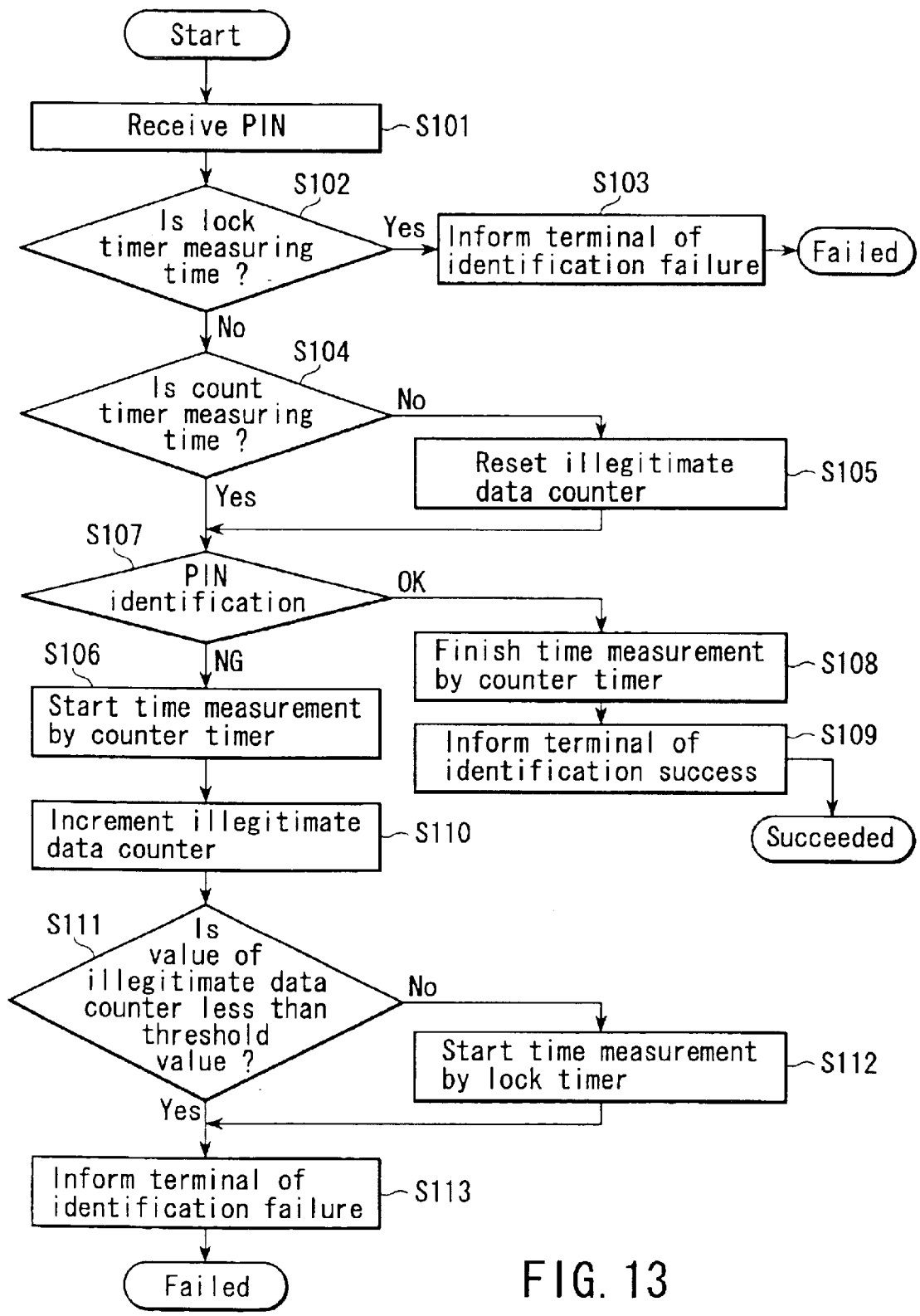
FIG. 13 is a flowchart useful in explaining a modification of the operations related to PIN identification.

Referring to the flowchart of FIG. 13, another modification of the above-described PIN identification process will be described in detail.

This modification differs from the flowchart of FIG. 11 only in that in the latter, the count timer starts time measurement at the step S106, while in the former, the count timer does it after the step S107. In the modification, when an illegitimate PIN is detected by PIN identification, the count timer 37 restarts time measurement.

Figures 14A, 14B:
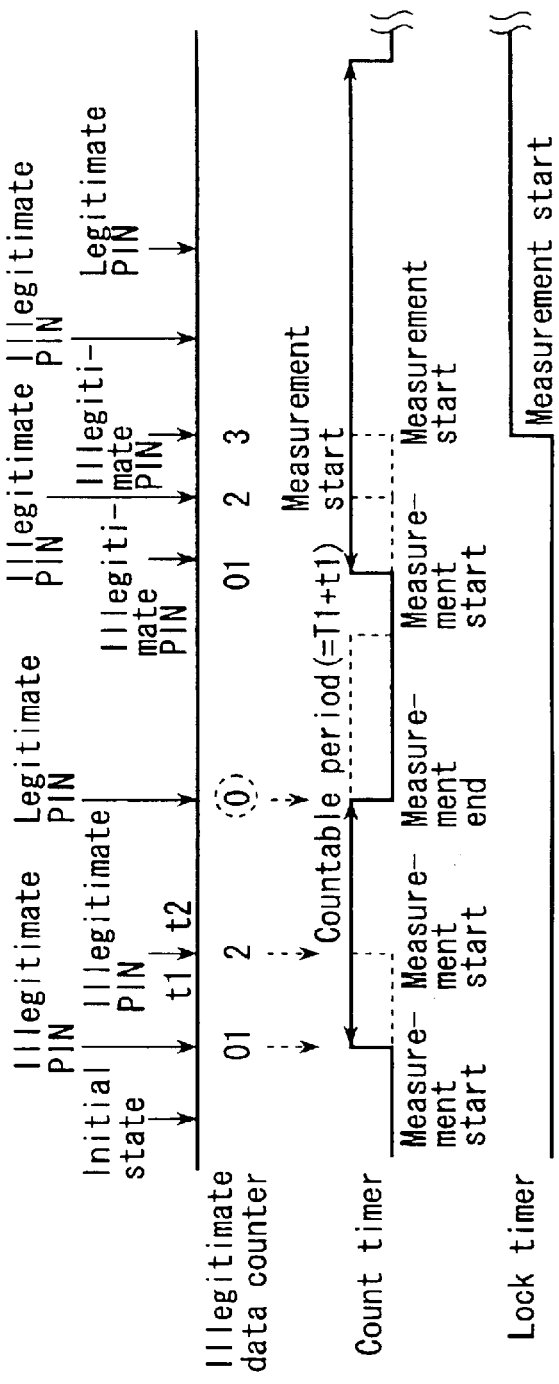
FIGS. 14A and 14B are time charts according to the flowchart of FIG. 13 that illustrates the modification of the operation related to PIN identification.

FIGS. 14A and 14B are time charts according to the last-mentioned modification. The conditions employed in these time charts are the same as those in FIGS. 12A and 12B.

As is understood from FIGS. 14A and 14B, when the lock timer 36 does not perform time measurement (when the value of the illegitimate data counter does not exceed the threshold value), the count timer 37 restarts time measurement each time an illegitimate PIN is input during time measurement, resulting in an extension of time measurement. Further, as shown in the left portion of FIG. 14B, if an illegitimate PIN is input, when the lock timer 36 does not perform time measurement (when the value of the illegitimate data counter does not exceed the threshold value), and when the count timer 37 is measuring time, the time measurement of the timer 37 is stopped. On the other hand, as shown in the right portion of FIG. 14B, when the lock timer 36 is measuring time (when the value of the illegitimate data counter exceeds the threshold value), the operation of the count timer 37 does not change (the period of the time measurement of the timer 37 is not extended), even if either, a legitimate PIN or an illegitimate PIN is input.

The above-described modification provides a further advantage (compared to the flowchart of FIG. 11) of being assured that if the IC card is not locked, PIN input can be resumed a predetermined period after the last PIN input, unless no further PIN is input during the predetermined period.

As described above, the IC card according to the modification of the embodiment uses, for locking, a timer operable without external power, therefore can receive a further PIN a predetermined period after the IC card is locked.

Furthermore, the IC card according to the modification uses, for counting, a timer operable without external power, therefore can reset the illegitimate data counter if a predetermined period elapses from the last PIN input.

By virtue of the above structure, even if a legitimate user has unintentionally input an illegitimate PIN a number of times that is larger than the threshold value, they can reuse the IC card after a predetermined period, without, for example, accessing the management side. Moreover, even if a third party attempts to crack the card by repeatedly guessing the legitimate PIN of the card, this attempt may well be thwarted, since PIN input is prevented until a predetermined period elapses and therefore an enormous amount of time is required to detect the legitimate PIN.

It is also advantageous that IC cards according to the embodiment enable their users to utilize conventional IC card terminals without modifying them.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card receiving a power from an external terminal and performing a process, the IC card comprising:
    a storage which stores first identification information uniquely assigned to the IC card;
    an acquisition unit configured to acquire second identification information from the external terminal;
    a first timer including a first change unit whose state changes with lapse of time without the power, the state of the first change unit changing from a first initial state to a final state via an intermediate state, the first timer outputting a first signal indicative of a changed state of the first change unit in response to an instruction issued when the IC card receives the power;
    a comparison unit configured to compare the second identification information with the first identification information, determine whether or not the second identification information and the first identification information are identical to each other, and provide a first initializing signal according to at least one of determined results; and a controller which initializes the first change unit to the first initial state when receiving the first initializing signal from the comparison unit, the controller further controlling the IC card to make it inhibit the process until the state of the first change unit changes to the intermediate state.

2. The IC card according to claim 1, the comparison unit including a count unit configured to count times of the determined results until the number of times at least reaches a preset upper limit, the comparison unit providing the first initializing signal if the number of times reaches the preset upper limit.

3. The IC card according to claim 2, further comprising a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, the comparison unit further configured to provide a second initializing signal each time the comparison unit determines that the second identification information fails to identify with the first identification information, and the controller initializing the second change unit to the second initial state when receiving the second initializing signal from the comparison unit.

4. The IC card according to claim 3, wherein if the first timer fails to measure a time, if the second timer measures a time, and if the comparison unit determines that the second identification information is identical to the first identification information, the controller regards that the second timer fails to measure a time.

5. The IC card according to claim 2, further comprising a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, the controller regarding that the second timer fails to measure a time each time the comparison unit determines that the second identification information identifies with the first identification information.

6. The IC card according to claim 5, wherein the controller instructs the count unit to reset the number of counted times if the controller regards that the second timer fails to measure a time.

7. The IC card according to claim 2, further comprising a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, the second timer starting from the second initial state at which the count unit starts counting, and ending after a preset period.

8. The IC card according to claim 7, wherein if the first timer fails to measure a time, if the second timer measures a time, and if the comparison unit determines that the second identification information is identical to the first identification information, the controller regards that the second timer fails to measure a time.

9. A method of preventing illegal use of an IC card, the IC card receiving a power from an external terminal and performing a process, the method comprising:

preparing an IC card including a storage which stores first identification information uniquely assigned to the IC card, an acquisition unit configured to acquire second identification information from the external terminal, a first timer including a first change unit whose state changes with lapse of time without the power, the state of the first change unit changing from a first initial state to a final state via an intermediate state, the first timer outputting a first signal indicative of a changed state of the first change unit in response to an instruction issued when the IC card receives the power;

comparing the second identification information with the first identification information, determining whether or not the second identification information and the first identification information are identical to each other, and providing a first initializing signal according to at least one of determined results; and initializing the first change unit to the first initial state when the first initializing signal is received, and inhibiting the process until the state of the first change unit changes to the intermediate state.

10. The method according to claim 9, comparing the second identification information including:

counting times of the determined results; and providing the first initializing signal if the number of times reaches a preset value.

11. The method according to claim 10, wherein the IC card further includes a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, the method further comprising providing a second initializing signal each time it is determined that the second identification information fails to identify with the first identification information, and initializing the second change unit to the second initial state when the second initializing signal is received.

12. The method according to claim 11, wherein if the first timer fails to measure a time, if the second timer measures a time, and if it is determined that the second identification information is identical to the first identification information, it is regarded that the second timer fails to measure a time.

13. The method according to claim 10, wherein the IC card further includes a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, the method further comprising regarding that the second timer fails to measure a time each time it is determined that the second identification information identifies with the first identification information.

14. The method according to claim 13, further comprising resetting the number of counted times if it is regarded that the second timer fails to measure a time.

15. The method according to claim 10, wherein the IC card further includes a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, the method further comprising instructing the second timer starting from the second initial state at which counting is started, and ending after a preset period.

16. The method according to claim 15, wherein if the first timer fails to measure a time, if the second timer measures time, and if it is determined that the second identification information is identical to the first identification information, it is regarded that the second timer fails to measure a time.

17. A program stored in a storage medium and executed by a processor included in an IC card, the program comprising:

means for instructing a processor to compare second identification information with first identification information, determine whether or not the second identification information and the first identification information are identical to each other, and providing a first initializing signal according to at least one of determined results the IC card receiving a power from an external terminal and performing a process using the program, the IC card including: a storage which stores the first identification information uniquely assigned to the IC card; an acquisition unit configured to acquire the second identification information from the external terminal; and a first timer including a first change unit whose state changes with lapse of time without the power, the state of the first change unit changing from a first initial state to a final state via an intermediate state, the first timer outputting a first signal indicative of a changed state of the first change unit in response to an instruction issued when the IC card receives the power; and means for instructing the processor to initialize the first change unit to the first initial state when the first initializing signal is received, and instructing the processor to inhibit the process until the state of the first change unit changes to the intermediate state.

18. The program according to claim 17, means for instructing a processor to compare second identification information including means for instructing the processor to count times of the determined results, and means for instructing the processor to provide the first initializing signal if the number of times reaches a preset value.

19. The program according to claim 18, wherein the IC card further includes a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, and the program includes means for instructing the processor to provide a second initializing signal each time it is determined that the second identification information fails to identify with the first, and means for instructing the processor to initialize the second change unit to the second initial state when the second initializing signal is received.

20. The program according to claim 19, wherein if the first timer fails to measure a time, if the second timer measures a time, and if it is determined that the second identification information is identical to the first identification information, it is regarded that the second timer fails to measure a time.

21. The program according to claim 18, wherein the IC card further includes a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, and the program includes means for instructing the processor to regard that the second timer fails to measure a time each time it is determined determines that the second identification information identifies with the first identification information.

22. The program according to claim 21, further comprising means for instructing the processor to reset the number of counted times if it is regarded that the second timer fails to measure a time.

23. The program according to claim 18, wherein the IC card further includes a second timer including a second change unit whose state changes with lapse of time starting from a second initial state without the power, at a rate different from a change rate of the first change unit, the second timer outputting a second signal indicative of a changed state of the second change unit in response to an instruction issued when the IC card receives the power, the second timer starting from a second initial state at which counting is started, and ending after a preset period.

24. The program according to claim 23, wherein if the first timer fails to measure a time, if the second timer measures a time, and if it is determined that the second identification information is identical to the first identification information, it is regarded that the second timer fails to measure a time.

* * * * *